United States Patent Office 3,017,405
Patented Jan. 16, 1962

3,017,405
PROCESS FOR PREPARING SALTS OF HYDRO-
CARBON - PHOSPHORUS SULFIDE REACTION
PRODUCTS
Herman D. Kluge, Fishkill, Jackson W. Wisner, Jr., Wap-
pingers Falls, and Roger G. Lacoste, Hopewell Junc-
tion, N.Y., assignors to Texaco Inc., New York, N.Y.,
a corporation of Delaware
No Drawing. Filed Sept. 23, 1959, Ser. No. 841,701
12 Claims. (Cl. 260—139)

This invention relates to a process for preparing alkaline earth metal salts of phosphorus sulfide-hydrocarbon reaction products. More particularly, this invention involves an improvement in the neutralization of hydrocarbon-phosphorus sulfide reaction products whereby more fluent concentrates of alkaline earth metal salts of hydrocarbon-phosphorus sulfide reactions products are obtained.

Metal containing neutralized reaction products of phosphorus sulfide in a hydrocarbon are known to be effective additives in the formulation of lubricants for internal combustion engines. The use of neutralized phosphorus sulfide-hydrocarbon reaction products as components of lubricant compositions is disclosed in U.S. Patents 2,316,080 and 2,316,082 which issued April 6, 1943, to C. M. Lane et al. When it became desirable to increase the basicity of these metal-phosphorus sulfide-hydrocarbon reaction products to improve their detergency and effectiveness in neutralizing acidic fuel combustion products particularly those obtained during low temperature operation, there was encountered the problem of the highly viscous nature of lubricating oil concentrates of the basic alkaline earth salts of olefin-phosphorus sulfide reaction products. The subject invention is specifically directed to this problem and provides the means whereby the concentrates formed in the neutralization reaction are fluid, easy to handle products.

U.S. 2,806,022 teaches a process for producing basic metal phosphorus sulfide-hydrocarbon reaction products by neutralization of a phosphorus sulfide-hydrocarbon product with the prescribed amount of basic metal compound in the presence of a mixture of water and a $C_1$ to $C_3$ alcohol in prescribed amounts. Our copending application Serial No. 750,873, filed July 25, 1958, now U.S. Patent 2,935,505, relates to a process for producing highly over-based metal phosphorus sulfide-hydrocarbon reaction products by effecting neutralization in the presence of a mixture of water and an ether alcohol. The process of the present invention assures the production of a fluid basic salt concentrate by these processes.

In accordance with the process of the invention, the phosphorus sulfide-hydrocarbon reaction product is neutralized with an alkaline earth metal basic inorganic compound in a lubricating oil medium in the presence of an ethylene oxide adduct of the general formula:

$$RX(CH_2CH_2O)_nH$$

wherein R is a hydrocarbyl radical containing at least 10 carbon atoms, X is —O—, —NH—, —CONH— or —COO— and n has a value of 1–12. The presence of an ethylene oxide adduct of prescribed composition assures the production of a fluid lubricating oil concentrate of alkaline earth metal salts of hydrocarbon-phosphorus sulfide reaction products and substantially improves the conversion of the hydrocarbon-phosphorus sulfide product to alkaline earth metal salt. The ethylene oxide adduct constitutes a minor portion of the neutralization reaction mixture and is usually present in a concentration equivalent to 2–30 weight percent of the hydrocarbon-phosphorus sulfide component of the neutralization mixture.

As disclosed in the afore-identified Loane et al. patent, the hydrocarbon reacted with the phosphorus sulfide may be either an aromatic hydrocarbon, a cycloaliphatic hydrocarbon or an aliphatic hydrocarbon. Aliphatic-substituted aryl compounds, aryl-substituted cycloaliphatic compounds and aryl-substituted aliphatic compounds are also usable as a hydrocarbon reactant with phosphorus sulfide to form reaction products, which on neutralization, yield metal salts useful as lubricating oil additives. Olefins, however, are by far the preferred reagents for reaction with phosphorus sulfides.

The olefinic hydrocarbons reacted with phosphorus sulfides usually contain at least 12 carbon atoms although lower molecular weight olefins can be employed. Monoolefin polymers such as isobutylene polymer, butylene polymer, propylene polymer, and copolymers of monoolefins such as propylene-isobutylene copolymer are particularly preferred materials for reaction with phosphorus sulfides. In general, monoolefin polymers and copolymers having an average molecular weight between about 400 and 5000 are employed as the hydrocarbon reactant with polymers and copolymers having an average molecular weight in the range from about 600 to 2000 being particularly preferred. Copolymers of conjugated dienes and monoolefins such as a copolymer of butadiene and isobutylene having an average molecular weight in the above-prescribed range also react with phosphorus sulfides to give lubricant additives.

Olefins useful for reaction with phosphorus sulfides can also be prepared by halogenation of high molecular weight hydrocarbon fractions and subsequent dehydrohalogenation. Olefin fractions obtained by cracking of high molecular weight hydrocarbon fractions may also be used as the hydrocarbon reactant.

Although phosphorus sulfides such as $P_2S_5$, $P_4S_7$ and $P_4S_3$ may be used as the phosphorus sulfide reactant, phosphorus pentasulfide, $P_2S_5$, is used in substantially all commercial preparations because of its availability and cost. In subsequent description, $P_2S_5$ will be used to illustrate the invention process.

The olefin-$P_2S_5$ reaction product obtained by reacting about 5 to about 40 percent phosphorus sulfide with olefin at a temperature of from about 100–320° C. in a non-oxidizing atmosphere, for example, under a blanket of nitrogen, is usually hydrolyzed at a temperature between about 100 and 260° C. by contact with steam. Steam treatment hydrolyzes the olefin-$P_2S_5$ reaction product to an organic phosphorus- and sulfur-containing acidic reaction product believed to be an alkenethiophosphonic acid and inorganic phosphorus acids. The alkenethiophosphonic acid has the general formula:

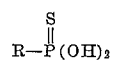

wherein R is the charge olefin radical.

The inorganic phosphorus acids formed by hydrolysis can be removed from the hydrolyzed phosphorus sulfide-hydrocarbon reaction product by a number of different processes. In the Watson U.S. Patent 2,688,612 removal of the inorganic phosphorus acids is effected by treatment with an alkaline adsorbent clay. In our commonly assigned copending applications, Serial Nos. 750,874, filed July 25, 1958, and 763,812 filed September 29, 1958, now U.S. Patent 2,951,835, removal of the inorganic phosphorus acids is effected by contact with synthetic hydrous alkaline earth metal silicates and synthetic hydrous alkali metal silicates, respectively.

The inorganic phosphorus acids may also be removed by extraction procedures such as in the Lemmon et al. U.S. Patent 2,843,579 wherein removal is effected by extraction with a mixture of water and a $C_1$ to $C_5$ alcohol or phenol in prescribed proportions. A commonly assigned copending application Serial No. 841,668 filed of even date, describes a process wherein removal of the inorganic phosphorus acids is effected by extraction with anhydrous methanol.

The process of this invention is effective in producing fluid concentrates of alkaline earth metal salts of phosphorus sulfide-hydrocarbon reaction products regardless of the procedure used for removing inorganic phosphorus acids from the hydrolyzed hydrocarbon-phosphorus sulfide reaction product. It is particularly effective when adsorbent clays or synthetic hydrous alkaline earth metal silicates are used for the removal of inorganic phosphorus acids from hydrolyzed hydrocarbon-phosphorus sulfide reaction products since such techniques for removal of the inorganic acids appear to accentuate the problem of the viscosity of the concentrates of the alkaline earth metal salts of hydrocarbon-phosphorus sulfide products.

The addition of ethylene oxide adducts is also useful in direct neutralization of a hydrocarbon-phosphorus sulfide reaction product without the intermediate steps of hydrolysis and removal of the inorganic phosphorus acids formed thereby. Since alkaline earth metal salts of hydrocarbon-phosphorus sulfide products formed by a procedure involving hydrolysis of the hydrocarbon-phosphorus sulfide reaction product and removal of the inorganic phosphorus acids appear to be of superior quality from the standpoint of engine wear and detergency, the process of the invention is normally used in the neutralization of olefin-$P_2S_5$ products which have been so treated.

The alkaline earth basic metal inorganic compound employed in the neutralization is usually an alkaline earth metal oxide, hydroxide, or carbonate. Alkaline earth metal hydroxides and oxides, specifically, barium oxide, barium hydroxide, calcium oxide and calcium hydroxide, are the preferred basic inorganic compounds employed in the neutralization.

The ethylene oxide adducts which assure the production of a fluid concentrate of alkaline earth metal hydracarbon-$P_2S_5$ salt when present during the neutralization reaction in the prescribed concentration are represented by the general formula: $RX(CH_2CH_2O)_nH$ wherein R is a hydrocarbyl radical containing at least 10 carbon atoms, X is —O—, —NH—, —CONH— or —COO— and $n$ is an integer having a value of 1–12 and preferably 1–6. Ethylene oxide adducts of this type are prepared by reaction of an alcohol, a phenol, an amine, amide or acid of prescribed hydrocarbon chain length with ethylene oxide. The R in the foregoing formula is preferably either an aliphatic hydrocarbly radical or an alkaryl radical containing 10 to 20 carbon atoms.

Examples of preferred ethylene oxide adducts effective in the process of the invention are the following: an adduct of a $C_9$ alkylphenol and 2 mols of ethylene oxide, an adduct of a $C_9$ alkylphenol and 4 mols of ethylene oxide, an adduct of a $C_{12}$ alkylphenol and 3 mols of ethylene oxide, an adduct of a dinonylphenol and 8 mols of ethylene oxide, an adduct of a $C_{12}$ alkylphenol and 2 mols of ethylene oxide, an adduct of lauryl alcohol and 3 mols of ethylene oxide and an adduct of stearyl alcohol and 4 mols of ethylene oxide.

Examples of effective amine ethylene oxide adducts are the following: an adduct of lauryl amine and 3 mols of ethylene oxide, an adduct of a $C_{18}$ primary amine and 4 mols of ethylene oxide, an adduct of stearyl amine and 5 mols of ethylene oxide, an adduct of a hexadecyl amine and 2 mols of ethylene oxide, and an adduct of tallow amine (having an average of 16 carbon atoms) and 4 mols of ethylene oxide.

Fatty acids, rosin acids and tall oil acids condensed with ethylene oxide are also effective in making fluid concentrates of alkaline earth metal salts of phosphorus sulfide-hydrocarbon products. Examples of such compounds are the following: an adduct of stearic acid and 4 mols of ethylene oxide, an adduct of myristic acid and 6 mols of ethylene oxide, and an adduct of rosin acid and 2 mols of ethylene oxide.

Amide-ethylene oxide adducts effective in the process of the invention are exemplified by the following: an adduct of lauryl amide and 4 mols of ethylene oxide, an adduct of stearyl amide and 6 mols of ethylene oxide, an adduct of oleyl amide and 4 mols of ethylene oxide, and an adduct of palmitoyl amide and 5 mols of ethylene oxide.

A surprising feature of this invention is the specificity of ethylene oxide adducts in reducing the viscosity of the alkaline earth metal salt concentrates as evidenced by the fact that propylene oxide adducts are ineffective for this purpose. It has been theorized that the effectiveness of the polyethylene oxide adduct is related to their balance of hydrophilic and lipophilic properties.

The ethylene oxide adduct is added to the neutralization mixture in a concentration equivalent to 2–30 weight percent and preferably 4–16 weight percent of the hydrocarbon-$P_2S_5$ reaction product component of the neutralization reaction mixture. The concentration to be employed varies to some extent with the prior treatment of the hydrocarbon-$P_2S_5$ reactant. For example, a concentration of the order of 4–16 weight percent is recommended if the hydrolyzed hydrocarbon-$P_2S_5$ reactant product has been contacted with adsorbent clay or a synthetic alkaline earth metal hydrous silicate for removal of inorganic phosphorus acids because such pretreatment appears to accentuate the gelling tendency of the resulting concentrate of alkaline earth metal hydrocarbon-$P_2S_5$ product formed during neutralization. When the hydrolyzed hydrocarbon-$P_2S_5$ reactant has been extracted with either anhydrous methanol or with a water-alcohol mixture, concentrations of ethylene oxide adducts of the order of 2–12 weight percent are sufficient to assure the production of a fluid salt concentrate and high conversions of the alkenethiophosphonic acid to alkaline earth metal salt.

Neutralization of the olefin-$P_2S_5$ product is effected in a medium comprising the mineral lubricating oil employed as a diluent for the olefin-$P_2S_5$ product and a solvent which is either water, alcohol, a mixture of water and alcohol, or a mixture of water and an alkoxyalkanol. The use of a water-alkoxyalkanol solvent mixture for the preparation of basic alkaline earth metal salts of olefin-$P_2S_5$ products is the subject matter of the previously identified copending application Serial No. 750,873. The use of methanol as a solvent in the neutralization step constitutes the subject matter of the previously-mentioned copending commonly assigned application Serial No. 841,668 filed of even date. Ethylene oxide adducts are effective in reducing the viscosity of the alkaline earth metal salt concentrates produced by neutralization in all of these solvent media.

The process of the invention is illustrated in the following examples showing the action of various surfactants on the viscosity of concentrates of alkaline earth metal salts of olefin-$P_2S_5$ reaction products and on the utilization of the alkaline earth metal inorganic compound.

*Example 1.*—A polybutylene-$P_2S_5$ reaction product was prepared by reacting polybutylene having an average molecular weight of about 780 with $P_2S_5$ in a ratio of 1.25 mols of olefin per mol of $P_2S_5$ in the presence of sulfur in an amount equal to 0.5 weight percent of polybutylene and at a temperature of 450° F. for 4 hours in a nitrogen atmosphere. The reaction product was then diluted with a paraffin base distillate having an SUS at 100° F. of about 100 in an amount equivalent to 1.69 times the weight of the polyolefin reactant. The lubricating oil concentrate of the olefin-$P_2S_5$ reaction product was steamed at 375° F. for 4 hours in a nitrogen atmosphere and then dried by passing nitrogen therethrough. The hydrolyzed product, which had a Neut. No. of 56.3, was treated with synthetic hydrous calcium silicate in an amount equivalent to about 108 weight percent of the $P_2S_5$ reactant at a temperature of 300° F. The mixture of concentrate and adsorbent was stirred for one hour in a nitrogen atmosphere and then was filtered to give a clear concentrate having a Neut. No. of 18.2.

To one mol of alkenethiophosphonic acid thus produced, there were added 1.57 mols of barium oxide and 12.0 mols of methyl alcohol. The resulting mixture was then $CO_2$ blown at ambient temperature for one hour. The methyl alcohol solvent was then removed by increasing the temperature from 190 to 200° F. after which 4.7 mols of water was carefully added and the reaction mixture refluxed for ½ hour. The temperature was then raised to 350° F. with $CO_2$ blowing which was continued for one hour. The resulting product filtered slowly to give a product which was almost a gel and had a kinematic viscosity at 210° F. of 1402.0 cs. Analysis of the product showed that it contained 6.85% barium as contrasted with a theoretical barium content of 8.14%, indicating a barium conversion of 84%.

*Example 2.*—In this example, the hydrolyzed synthetic calcium hydrous silicate treated alkenethiophosphonic acid prepared as outlined in Example 1, was neutralized by the identical procedure set forth for the salt-forming step in Example 1 with the exception that 4.0 weight percent of an adduct of nonylphenol and 2 mols of ethylene oxide was added during neutralization. Accordingly, to a concentrate containing 1 mol of alkenethiophosphonic acid there were added an adduct of nonylphenol and 2 mols of ethylene oxide in an amount equal to 4.0 weight percent of alkenethiophosphonic acid, 1.57 mols of barium oxide and 12.0 mols of methanol. After treatment as outlined in Example 1, there was obtained a product which filtered well and had a kinematic viscosity at 210 of 197.6 cs. Analysis of the barium salt concentrate showed that it contained 6.82% barium as compared with a theoretical barium content of 7.93% indicating a barium conversion of 86%.

Comparison of Examples 1 and 2 shows clearly that the addition of the ethylene oxide adduct of alkylphenol during the neutralization effected a substantial improvement in processing as indicated by the better filtration rate in the fluidity of the resulting product as indicated by the kinematic viscosity of the concentrate and in the percent barium conversion.

In Table I there are shown the results of adding 4.0 weight percent of ethylene oxide adducts to the neutralization of an alkenethiophosphonic acid produced as set forth in Example 1. The neutralization procedure employed in the runs shown in Table I was the same as that described in Example 1. There are also shown in Table I the ineffectiveness of surfactants other than the ethylene oxide adducts of the composition prescribed herein.

TABLE I

*Effect of 4.0 weight percent surfactant during neutralization of alkene thiophosphonic acid with barium oxide*

| Additive | Properties of Salt Concentrate | | | | |
|---|---|---|---|---|---|
| | Percent Barium | | Percent Barium Con.e | Kin. Vis. at 210° F., cs. | Filtration Characteristics |
| | Theo | Found | | | |
| 1. None (Ex. 1) | 8.14 | 6.85 | 84 | 1,402.0 | Slowly—Near Gel. |
| 2. Adduct of nonylphenol+2 mols ethylene oxide (Ex. 2). | 7.93 | 6.82 | 86 | 197.6 | Well. |
| 3. Adduct of nonylphenol+6 mols ethylene oxide. | 7.85 | 6.78 | 86 | 171.8 | Fair. |
| 4. Adduct of nonylphenol+1 mol ethylene oxide. | 7.86 | 6.98 | 89 | 220.6 | Well. |
| 5. 50-50 blend of butyl Carbitol and adduct of nonylphenol+2 mols ethylene oxide. | 7.98 | 7.11 | 89 | 156.8 | Very Well. |
| 6. Adduct of tridecanol+3 mols ethylene oxide. | 8.07 | 7.38 | 91 | 178.8 | Do. |
| 7. Adduct of tridecanol+3 mols ethylene oxide. | 7.84 | 6.97 | 88 | 185.6 | Well. |
| 8. Adduct of hydrogenated tallow amide and 5 mols of ethylene oxide. | 7.86 | 7.22 | 92 | 194.3 | Fair. |
| 9. Monomyristate ester of polyethylene glycol 200. | 7.83 | 7.18 | 92 | 150.7 | Good. |
| 10. Adduct of stearic acid and 5 mols of ethylene oxide. | 7.84 | 7.09 | 90 | 239.0 | Do. |
| 11. Adduct of tallow amine and 5 mols of ethylene oxide. | 8.05 | 7.10 | 88 | 166 | Well. |
| 12. Sorbitan trioleate (Span 85). | 7.90 | 7.76 | 98 | 942.0 | Poorly—Near Gel. |
| 13. Polyoxyethylene sorbitan monooleate (Tween 80). | (1) | (1) | (1) | (1) | (1). |
| 14. Polyoxyethyleneoxypropylene stearate. | 8.02 | 6.52 | 81 | 870 | Slowly. |
| 15. Monomyristate ester of polypropylene glycol 250. | 8.28 | 7.34 | 89 | 905.7 | Difficult. |

[1] Too viscous—discarded.

Runs 2 through 11 demonstrate the effectiveness of ethylene oxide adducts of alkylphenols, alcohols, acids, amides and amines in improving the viscosity of the concentrates of barium salts of alkenethiophosphonic acids. The reduction in viscosity of the concentrate from a level of about 1400 cs. in the absence of the polyethylene oxide adduct to the 200 level by the presence of 4.0 weight percent ethylene oxide adducts during the neutralization is a significant and dramatic improvement. It will also be noted that the presence of the ethylene oxide adducts improves the percent barium conversion.

Runs 12 through 15 demonstrate the specificity of action of ethylene oxide aducts of prescribed composition in reducing the gelatinous nature of concentrates of alkaline earth metal salts of alkenethiophosphonic acids. It is particularly significant that run 15 in which a propylene oxide adduct of a monocarboxylic acid is employed is ineffective whereas run 9 employing an ethylene oxide adduct of the same acid is effective.

Although the effect is not as marked, the presence of the prescribed amount of ethylene oxide adducts also substantially improves the barium utilization and viscosity of concentrates of alkaline earth metal salts of alkenethiophosphonic acids formed from olefin-$P_2S_5$ products which have been hydrolyzed and subjected to alcohol extraction for the removal of inorganic phosphorus acids. The action of ethylene oxide adducts in improving the viscosity of alkaline earth metal salt concentrates produced from hydrolyzed olefin-$P_2S_5$ products from which the inorganic acids have been removed by methanol extraction is shown in Example 3.

*Example 3.*—A polybutylene-$P_2S_5$ reaction product was prepared by reacting polybutylene having an average molecular weight of about 780 with $P_2S_5$ in a ratio of 1.25 mols of polybutylene per mol of $P_2S_5$ in the presence of sulfur in an amount equal to 0.5 weight percent of polybutylene. The reaction was effected at 450° F. over a four-hour period in a nitrogen atmosphere. The reaction product was diluted with a paraffin base distillate having an SUS at 100° F. of about 100 in an amount equivalent to 1.39 times the weight of the polyolefin reactant. The lubricating oil concentrate was steamed at 375° F. for four hours in a nitrogen atmosphere and then dried by passing nitrogen therethrough at the same temperature. The hydrolyzed product having a Neut. No. of 76.3 was extracted with an equal volume of methyl alcohol at 75° F. and then centrifuged to give a methanol extract containing inorganic phosphorus acids and a lubricating oil raffinate containing the olefin-$P_2S_5$ product and having a Neut. No. of 28.8.

To the lubricating oil concentrate containing 1 mol of alkenethiophosphonic acid, there was added 1.57 mols of barium oxide and 12.0 mols of methyl alcohol. The resulting mixture was then blown with $CO_2$ at ambient temperature for one hour after which the methyl alcohol solvent was removed by increasing the temperature from 190 to 200° F. After removal of the methyl alcohol, 4.7 mols of water were carefully added and the reaction mixture refluxed for ½ hour. The temperature was then raised to 250° F. while $CO_2$ was blown therethrough after which the product was blown with $CO_2$ for one hour. Filtration gave a product which had a kinematic viscosity at 210° F. of 265.8 cs. Analysis of the product showed that it contained 7.39% barium against the theoretical barium content of 8.37% indicative of a barium conversion of 88.4%.

*Example 4.*—In this example another portion of the lubricating oil concentrate of alkenethiophosphonic acid produced by methanol extraction of the hydrolyzed olefin-$P_2S_5$ product formed in Example 3 was neutralized by the same procedure employed in Example 4 with the exception that 2 weight percent surfactant, specifically an adduct of nonylphenol and 2 mols of ethylene oxide, was present during neutralization. To a portion of the lubricating oil concentrate containing 1 mol of alkenethiophosphonic acid, there were added 1.57 mols of barium oxide, 12 mols of methanol and 2 weight percent of a nonylphenol-2 mols ethylene oxide adduct basis the weight of the alkenethiophosphonic acid. This neutralization reaction mixture was treated by the identical procedure outlined in Example 3 to give a concentrate of the barium salt of the alkenethiophosphonic acid having a kinematic viscosity at 210° F. of 144.3 cs. and having a bright appearance. This concentrate analyzed 7.3 weight percent barium as contrasted with the theoretical barium content of 8.18 percent indicating a barium conversion of 89%.

In Table II there are shown the results of adding various concentrations of a nonylphenol-2 mols ethylene oxide adduct to a lubricating oil concentrate of alkenethiophosphonic acid prepared as in Example 3 by methanol extraction of the hydrolyzed olefin-$P_2S_5$ product.

TABLE II

*Effect of nonylphenol-ethylene oxide adduct on neutralization of methanol extracted alkenethiophosphonic acid*

| Additive | Wt. Percent | Percent Barium | | Percent Barium Conversion | Kin. Vis., 210° F., cs. | Appearance |
|---|---|---|---|---|---|---|
| | | Theor. | Found | | | |
| None | | 8.37 | 7.39 | 88.4 | 265.8 | Hazy. |
| Adduct of Nonylphenol+2 mols Ethylene Oxide | 2 | 8.18 | 7.30 | 89.0 | 144.3 | Bright. |
| Do | 6 | 7.74 | 7.35 | 95.0 | 80.9 | Do. |

The data in the foregoing table show the improvement effected in the conversion of methanol extracted alkenethiophosphonic acids to their barium salts by the presence of alkylene oxide adducts to alkylphenols. The percent barium conversion is significantly better and the resulting concentrate is substantially more fluid then when neutralization is effected in the absence of the prescribed alkylene oxide adduct.

Obviously, many modifications and variations of the invention as hereinbefore set forth may be made without departing from the spirit and scope thereof, and therefore, only such limitations should be imposed as are indicated in the appended claims.

We claim:
1. In the neutralization of a phosphorus sulfide-hydrocarbon reaction product with a basic alkaline earth metal inorganic compound in a solvent medium containing a mineral lubricating oil, the improvement which comprises effecting said neutralization in the presence of a minor amount of a surfactant having the general formula: $RX(CH_2CH_2O)_nH$ wherein R is a hydrocarbon radical containing at least 10 carbon atoms, X is selected from the group consisting of —O—, —NH—, —CONH— and —COO— and n has a value of 1–12, said minor amount of adduct substantially reducing the viscosity of the resulting salt concentrate and effecting a higher degree of alkaline earth metal inorganic compound utilization.

2. The improvement according to claim 1 in which said surfactant is employed in a concentration between 2 and 30 weight percent of the phosphorus sulfide-hydrocarbon reaction product.

3. In the neutralization of an alkenethiophosphonic acid, formed by a procedure involving hydrolysis of an olefin-$P_2S_5$ reaction product and separation of inorganic phosphorus acids from the hydrolyzed product, with a basic alkaline earth metal inorganic compound in a solvent medium containing a mineral lubricating oil, the improvement which comprises effecting said neutralization in the presence of a minor amount of a surfactant having the general formula: $RX(CH_2CH_2O)_nH$ wherein R is a hydrocarbon radical containing at least 10 carbon atoms, X is selected from the group consisting of —O—, —NH—, —CONH— and —COO— and n has a value of 1–12, said minor amount of adduct substantially reducing the viscosity of the resulting salt concentrate and effecting a higher degree of alkaline earth metal inorganic compound utilization.

4. The improvement according to claim 3 in which said R is selected from the group consisting of aliphatic hydrocarbon radicals containing 10–20 carbon atoms and alkaryl hydrocarbon radicals containing 10–20 carbon atoms.

5. The improvement according to claim 3 in which said surfactant is employed in a concentration equivalent to 2–30 weight percent of said alkenethiophosphonic acid.

6. The improvement according to claim 3 in which said surfactant is employed in a concentration of 4–16 weight percent of said alkenethiophosphonic acid.

7. The improvement according to claim 3 in which said surfactant is an adduct of an alkylphenol and ethylene oxide.

8. The improvement according to claim 3 in which said surfactant is an adduct of an aliphatic alcohol and ethylene oxide.

9. The improvement according to claim 3 in which said surfactant is an adduct of an aliphatic monocarboxylic acid and ethylene oxide.

10. The improvement according to claim 3 in which said surfactant is an adduct of aliphatic monocarboxylic acid amide and ethylene oxide.

11. The improvement according to claim 3 in which said surfactant is an adduct of an aliphatic amine and ethylene oxide.

12. In the neutralization of alkenethiophosphonic acids, formed by the procedure involving hydrolysis of an olefin-$P_2S_5$ reaction product and removal of inorganic phosphorus acids from the hydrolyzed product, with a basic barium inorganic compound in a solvent medium comprising mineral lubricating oil and a hydroxy compound selected from the group consisting of water, alcohol, water-alcohol and water-alkoxy-alkanol, the improvement which comprises effecting said neutralization in the presence of a minor amount of a surfactant having the general formula: $RX(CH_2CH_2O)_nH$ wherein R is a hydrocarbon radical containing at least 10 carbon atoms, X is selected from the group consisting of —O—, —NH—, —CONH— and —COO— and $n$ has a value of 1–12, said minor amount of surfactant substantially reducing the viscosity of the resulting salt concentrate and effecting a higher degree of alkaline earth metal inorganic compound utilization.

No references cited.